Feb. 2, 1954     A. T. WILLIAMS     2,667,809

EXPOSURE METER

Filed Dec. 20, 1951

ALEXANDER T. WILLIAMS
INVENTOR.

BY
Gaylor, Cifelli & Jurick
ATTORNEYS

Patented Feb. 2, 1954

2,667,809

UNITED STATES PATENT OFFICE 2,667,809

EXPOSURE METER

Alexander T. Williams, Westfield, N. J., assignor to Weston Electrical Instrument Corporation, Newark, N. J., a corporation of New Jersey Application December 20, 1951, Serial No. 262,503

4 Claims. (Cl. 88—23)

This invention relates to photometers and more particularly to a photoelectric exposure meter used to determine correct exposure data for photographic purposes.

Exposure meters of the class contemplated by this invention comprise a self-generating photocell, a baffle for restricting the angular spread of light rays reaching the photocell, an electrical instrument responsive to the current generated by the photocell and including a pointer cooperating with a suitably calibrated scale, and a calculator mechanism for correlating the various factors related to the setting of a camera for proper film exposure.

An object of this invention is the provision of an exposure meter including calibrated means for exposing more or less of the photocell surface to light in accordance with a selected film speed and camera shutter speed whereby the scale of the meter can be calibrated directly in terms of camera diaphragm openings.

An object of this invention is the provision of an exposure meter comprising a photocell, a movable coil rotatable in response to the current generated by the photocell, a pointer carried by the movable coil and cooperating with a scale calibrated in terms of one exposure factor, a pivotally-mounted disc overlying the photocell surface and carrying calibrations in terms of film speeds, and a set of fixed reference marks cooperating with the calibrations of the disc and representing other exposure factors.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views.

Figure 1:
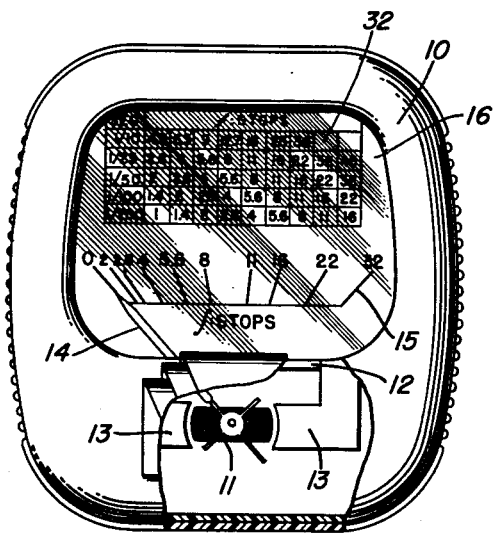
Figure 1 is a front view of an exposure meter made in accordance with this invention with part of the housing broken away.
Figure 2:
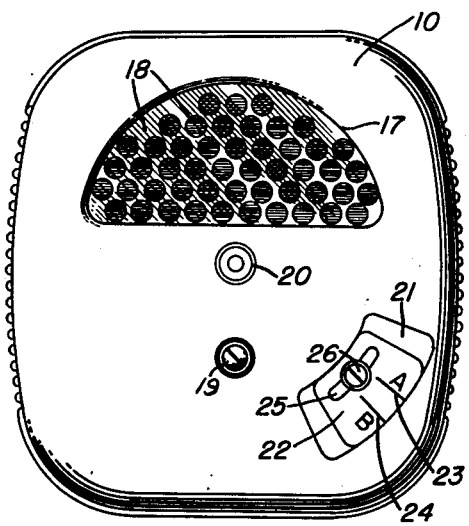
Figure 2 is a rear view of such meter.

Referring now to Figures 1 and 2, the exposure meter comprises a housing 10, made of plastic or other suitable material, which encloses a wire wound, pivotally-mounted movable coil 11 and the associated permanent magnet 12 and pole pieces 13. A pointer 14 is secured to the movable coil and cooperates with a scale 15 calibrated in terms of camera diaphragm openings (or f stops), as shown. The end of the pointer and the scale are visible through the window 16 carried by the front of the meter housing. The photocell is exposed to light through an opening 17 in the rear of the housing. As is well known in this art, a perforated baffle 18 is disposed over the active surface of the photocell for the purpose of restricting the angular spread of light rays reaching such surface. It may here be stated the photocell is connected to the movable coil whereby the angular rotation of the coil is related to the quantity of light impinging upon the photocell surface. The screw 19, shown in Figure 2, is a conventional zero-adjusting screw for setting the pointer 14 on the zero mark of the scale when light is blocked off completely from the photocell. The threaded bore 20 is utilized to secure a rotatable plate to the meter housing, as will be explained below. An arcuate recess 21, in the surface of the housing, accommodates a metal index plate 22 carrying the fiducial, or reference markings 23, 24, designated A and B, respectively. The plate 22 is provided with an arcuate slot 25 and is held in fixed position by a screw 26 threaded into the meter housing. Such arrangement affords adjustment of the index plate 22 during calibration of the meter in the factory.

Figure 3:
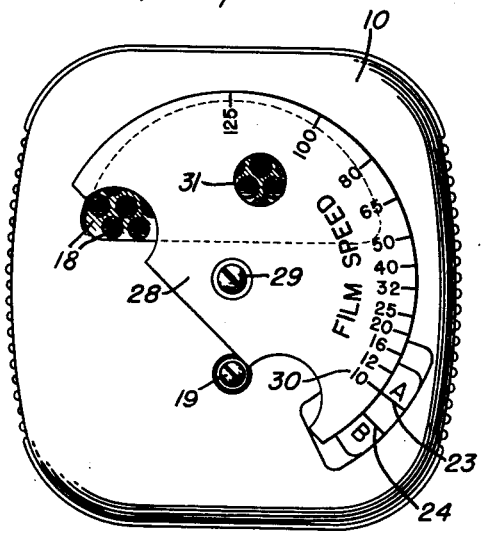
Figure 3 is similar to Figure 2 with a calibrated, rotatable plate attached to the meter housing.
Figure 4:
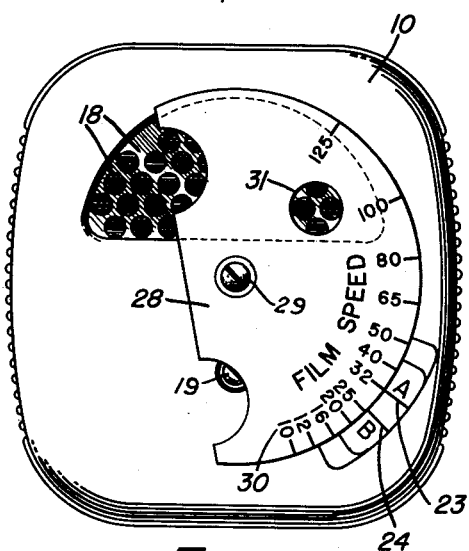
Figure 4 is similar to Figure 3 and showing the rotatable plate in another position.

Reference is now made to Figures 3 and 4. Here a thin, opaque, semi-circular disc 28 is pivotally-secured to the rear of the housing 10 as by the screw 29. Such disc carries a scale 30 calibrated in terms of film speeds, as shown. In the illustrated embodiment of the invention, the markings A and B, associated with the fixed reference marks 23, 24, represent the two types of conventional motion picture cameras. At 16 frames per second a type A camera has a shutter speed, or exposure time, of 1/34 second whereas a type B camera has a shutter speed of 1/50 second. Also, the most commonly used exposure time for ordinary, still photography is 1/50 second. Thus, the single fiducial mark 24 serves as a reference point for the setting of the disc 28 when the user intends to take still pictures at a shutter speed of 1/50 second or to take motion pictures with a B type motion picture camera.

To illustrate the use of the exposure meter, if the user intends to take motion pictures with a type A camera and the camera is loaded with a photographic film having a speed of 10, the disc 28 is rotated until the film speed mark 10 is alined with the fiducial mark 23, as shown in Figure 3. It will be noted that the opaque disc 28 overlies a greater portion of the photocell surface which, of course, will require a relatively high light intensity to bring the meter pointer to a given mark on the front scale 15, see Figure 1. If, however, the camera is loaded with a faster film, say 32, an alinement of the film speed mark 32 with the fiducial mark 23 will expose a greater amount of the photocell surface, as shown in Figure 4, and in this case the amount of light required to aline the meter pointer with the given scale mark will be substantially less. It is apparent, therefore, that the calibrated disc 28 is positionable to expose more or less of the photocell surface in accordance with the speed of the particular film being used. In any case, having once properly set the disc 28, the user then directs the instrument at the scene to be photographed so that light rays reflected from the scene will strike the photocell surface. The position of the meter pointer 14 relative to the scale 15 will provide a direct indication of the proper f: stop setting of the camera diaphragm thereby obviating the need for conventional calculator devices. In the event the user has a B type motion picture camera, or desires to take a still picture at a shutter speed of $1/50$ second, the appropriate film speed number, on the disc 28, is alined with the fiducial mark B.

The opaque disc 28, may be provided with an aperture 31, or a plurality of such apertures, for the purpose of distributing the light more generally over the active surface of the photocell when the disc covers a significant portion of such surface. This eliminates, to a practical extent, variations in the response of the instrument due to "high" or "low" current-output areas of the photocell surface and affords production economy by making it possible to use pre-printed scales.

In order to render the instrument useful for camera shutter speeds other than those specifically associated with the two, fixed reference marks 23, 24, the main scale plate of the meter may carry a suitable conversion table 32 visible through the front glass of the housing, as shown in Figure 1. Thus, if the instrument indicates a camera shutter opening of f:8, for a given film speed at $1/50$ second diaphragm speed, a shutter speed of $1/100$ second will require a diaphragm opening of f:5.6. The f: stop values in each vertical column are properly related to the shutter speeds, in the first column, to give uniform film exposure.

Having now described my invention certain changes and modifications will occur to those skilled in this art. Obviously, the fiducial marks 23, 24 need not be carried by adjustably-mounted plate but can be molded directly in the meter housing or engraved thereon. Also, the actual shutter speed values of $1/34$ and $1/50$ second (or, for that matter, any other values) can be substituted for the illustrated A and B designations. Still further, the fiducial markings may be designated in terms of camera diaphragm openings and the front instrument scale may then be calibrated directly in terms of camera shutter speeds. Since the relationship between camera shutter speed and diaphragm opening is fixed for a given film speed and a given quantity of light reflected from the scene to be photographed, any properly-coordinated arrangement of these four exposure factors can be applied to the cooperatively-associated scales, reference marks and indicating instrument. Once such instrument is calibrated it will provide a simple, direct-indicating device for determining proper camera settings. The above stated and other changes and modifications may be made without departing from the spirit and scope of the invention as set forth in the following claims.

I claim:

1. A direct-reading exposure meter comprising a housing having therein a window in the front and an opening in the back, an electrical movement disposed within the housing and including a movable coil carrying a pointer that is visible through the said window, a scale plate mounted in fixed position within the housing and carrying one set of exposure factors that are visible through the said window, a photocell mounted in said housing and connected to the said movable coil said photocell being positioned to receive light passing through the said opening, an opaque, semi-circular plate pivotally-secured to the housing and selectively rotatable to overlie more or less of the said opening, a second set of exposure factors carried by the semi-circular plate, and markings carried by the housing and cooperating with the exposure factors carried by the semi-circular plate, said markings corresponding to a third set of exposure factors.

2. The invention as recited in claim 1, wherein the said markings are carried by a plate adjustably secured to the housing.

3. The invention as recited in claim 1, wherein the said semi-circular plate includes an aperture overlying the said opening when the said plate is disposed in a predetermined position relative to the opening, and the said scale plate carries a conversion table of camera diaphragm openings and shutter speeds visible through the said window.

4. The invention as recited in claim 3, wherein the exposure factors carried by the scale plate are camera diaphragm openings, the exposure factors on the semi-circular plate are photographic film speeds values and the markings correspond to camera shutter speed values.

ALEXANDER T. WILLIAMS.

References Cited in the file of this patent

UNITED STATES PATENTS

| Number | Name | Date |
|---|---|---|
| 2,247,763 | Meyers | July 1, 1941 |
| 2,308,469 | McMaster | Jan. 12, 1943 |
| 2,353,163 | Keinath | July 11, 1944 |
| 2,482,281 | Lingel | Sept. 20, 1949 |
| 2,550,936 | Poirette | May 1, 1951 |
| 2,556,431 | Mihalyi | June 12, 1951 |

FOREIGN PATENTS

| Number | Country | Date |
|---|---|---|
| 570,429 | Great Britain | July 6, 1945 |